United States Patent
Schultz et al.

(10) Patent No.: US 10,668,899 B2
(45) Date of Patent: *Jun. 2, 2020

(54) TRANSPORTATION VACUUM ASSEMBLY

(71) Applicant: Emerson Electric Co., St. Louis, MO (US)

(72) Inventors: Douglas Schultz, Glen Carbon, IL (US); Shane Glasgow, St. Ann, MO (US); Mark Tomasiak, St. Peters, MO (US); Jason Hill, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 208 days.

This patent is subject to a terminal disclaimer.

(21) Appl. No.: 15/673,802

(22) Filed: Aug. 10, 2017

(65) Prior Publication Data

US 2017/0334409 A1    Nov. 23, 2017

Related U.S. Application Data

(63) Continuation of application No. 14/479,793, filed on Sep. 8, 2014, now Pat. No. 9,751,504.

(51) Int. Cl.
*B60S 1/64* (2006.01)

(52) U.S. Cl.
CPC ..................... *B60S 1/64* (2013.01)

(58) Field of Classification Search
CPC ............ B60S 1/64; A47L 7/0076; A47L 9/12
See application file for complete search history.

(56) References Cited

U.S. PATENT DOCUMENTS

| | | | |
|---|---|---|---|
| 5,189,753 A * | 3/1993 | Sousa | B60S 1/64 15/313 |
| 5,598,605 A | 2/1997 | Tomasiak | |
| 5,606,769 A | 3/1997 | Tomasiak | |
| 5,829,091 A * | 11/1998 | Ingram | A47L 5/38 15/313 |
| 6,128,804 A * | 10/2000 | Lee | B60N 3/086 15/313 |
| 6,691,396 B2 | 2/2004 | Martin | |
| 7,152,272 B2 | 12/2006 | Rukavina | |
| 7,266,859 B2 | 9/2007 | Slone | |
| 7,480,957 B2 | 1/2009 | Ganzenmuller, V | |
| 8,347,452 B2 | 1/2013 | Maehata | |
| 8,418,312 B2 | 4/2013 | Rhea | |
| 8,615,845 B2 | 12/2013 | Norell | |
| 9,751,504 B2 * | 9/2017 | Schultz | B60S 1/64 |
| 2004/0107528 A1 | 6/2004 | LeClear | |
| 2004/0134013 A1 * | 7/2004 | Slone | B60S 1/64 15/313 |

(Continued)

*Primary Examiner* — Dung Van Nguyen
(74) *Attorney, Agent, or Firm* — Armstrong Teasdale LLP

(57) ABSTRACT

A vacuum cleaner assembly designed for use in a vehicle having a passenger compartment such as those with at least one row of seats and a cargo area. The vacuum cleaner assembly preferably includes a power head, a collection drum or other container, and a hose. The powerhead of the present invention is powered by the vehicle's electrical system and is preferably mounted between exterior body panels and interior compartment panels of the vehicle. For example, the power head may be mounted between the exterior body panels and the interior compartment panels adjacent to, but not in the cargo area.

20 Claims, 4 Drawing Sheets

(56) References Cited

U.S. PATENT DOCUMENTS

| | | | |
|---|---|---|---|
| 2004/0154122 A1* | 8/2004 | Xu | B60S 1/64 15/313 |
| 2005/0066468 A1* | 3/2005 | Ganzenmuller | B60S 1/64 15/313 |
| 2006/0080801 A1 | 4/2006 | Nameth | |
| 2006/0085940 A1* | 4/2006 | Chernoff | A47L 5/24 15/313 |
| 2009/0019662 A1* | 1/2009 | Yona | B60S 1/64 15/313 |
| 2010/0043168 A1 | 2/2010 | Johnson | |
| 2016/0037988 A1* | 2/2016 | Schultz | A47L 5/365 15/347 |
| 2016/0368461 A1* | 12/2016 | Logli, Jr. | B60S 1/64 |

\* cited by examiner

TRANSPORTATION VACUUM ASSEMBLY

CROSS REFERENCE TO RELATED APPLICATIONS

This application is a continuation, and claims priority benefit, of U.S. application Ser. No. 14/479,793, filed Sep. 8, 2014, entitled "Transportation VACUUM ASSEMBLY".

STATEMENT REGARDING FEDERALLY SPONSORED RESEARCH OR DEVELOPMENT

Not applicable.

BACKGROUND OF THE INVENTION

Field of the Invention

The inventions disclosed and taught herein relate generally to vacuums; and more specifically related to vacuum systems for use in vehicles.

Description of the Related Art

U.S. Pat. No. 5,598,605 discloses "a utility vacuum cleaner tool caddy for utility vacuum cleaner drums as well as an axleless wheel mount are disclosed. The tool caddy has rear and front wheels with integral rear and front bumpers at least partially overlying the rear and front wheels. This provides a wider/larger wheel base/caddy which increases the stability of the utility vacuum cleaner during movement. The rear bumper is also provided with a plurality of spaced openings for receiving a corresponding number of vacuum tools which are stored in an out-of-way location when moving or storing the utility vacuum cleaner. The axleless wheel mount provides a snap-in mounting of individual wheels with full bearing support, thus eliminating the need of an axle between spaced and aligned wheels. Additionally, the wheel support increases the load capacity while improving the overall look and appearance of the base unit or tool caddy."

U.S. Pat. No. 5,606,769 discloses "a wet/dry utility vacuum cleaner with detachable blower is disclosed. The detachable blower, when mounted in sealed relationship to a lid positioned above a utility vacuum cleaner drum, operates as a wet/dry utility vacuum cleaner. When separated from the utility vacuum cleaner drum, the detachable blower can be used for non-vacuuming applications. The utility vacuum drum lid includes two detachable latches, a detachable blower latch and a detachable drum latch. The detachable blower latch detachably mounts the detachable blower to the lid while the detachable drum latch detachably mounts the lid relative to the utility vacuum cleaner drum. The detachable blower includes a U-shaped handle positioned in proximity to the detachable blower latch to enable gripping the U-shaped handle while permitting operation of the detachable blower latch for engaging or disengaging the detachable blower relative to the lid. Additional features incorporated in the detachable blower include a stable platform to enable the detachable blower to stand in an upright condition and a scroll design exhaust to increase blower efficiency. The wet/dry vacuum cleaner includes a diffuser for exhaust air flow providing circumferential air exhaust for reducing the velocity of exhaust air."

U.S. Pat. No. 6,691,396 discloses "a method of assembling a wet/dry vacuum and a wet/dry vacuum assembly in which each of the component parts of the assembly are placed in a fixture and attached to a unit without requiring reorienting the assembly. More specifically, the method includes attaching the various components of the wet/dry vacuum to a lid component, without requiring reorienting the assembly, simplifying the assembly process."

U.S. Pat. No. 8,418,312 discloses "wet/dry vacuum appliance assemblies and associated systems which facilitate the ease of removal of the filter assembly from within the appliance itself. The vacuum appliance assemblies described include a drum, a lid assembly adapted to removably mount on or to hinge on the drum, and a filter assembly housed within the lid assembly, wherein the lid assembly comprises a removable component such that if the removable component is removed, the filter assembly is accessible. Also described herein are methods of removing such a filter assembly from a wet/dry vacuum appliance, wherein the method includes removing a component of the lid assembly of the wet/dry vacuum in order to make the filter assembly accessible, grasping a handle of a filter assembly housed within the lid assembly of the wet/dry vacuum appliance, rotating the filter assembly so as to disengage it from a sealing relationship with the lower portion of an interior region of the lid assembly, and then removing the filter assembly from the vacuum appliance by pulling generally in an upward direction."

The inventions disclosed and taught herein are directed to vacuum systems for use in vehicles.

BRIEF SUMMARY OF THE INVENTION

The objects described above and other advantages and features of the invention are incorporated in the application as set forth herein, and the associated appendices and drawings, related to systems for vacuum systems for use in vehicles.

In accordance with a first embodiment of the present disclosure, a vacuum cleaner assembly has been designed for use in a vehicle having a passenger compartment such as those with at least one row of seats and a cargo area. The vacuum cleaner assembly preferably includes a power head, a collection drum or other container, and a hose. The powerhead of the present invention is powered by the vehicle's electrical system and is preferably mounted between exterior body panels and interior compartment panels of the vehicle. For example, the power head may be mounted between the exterior body panels and the interior compartment panels adjacent to, but not in the cargo area.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

Figure 1:
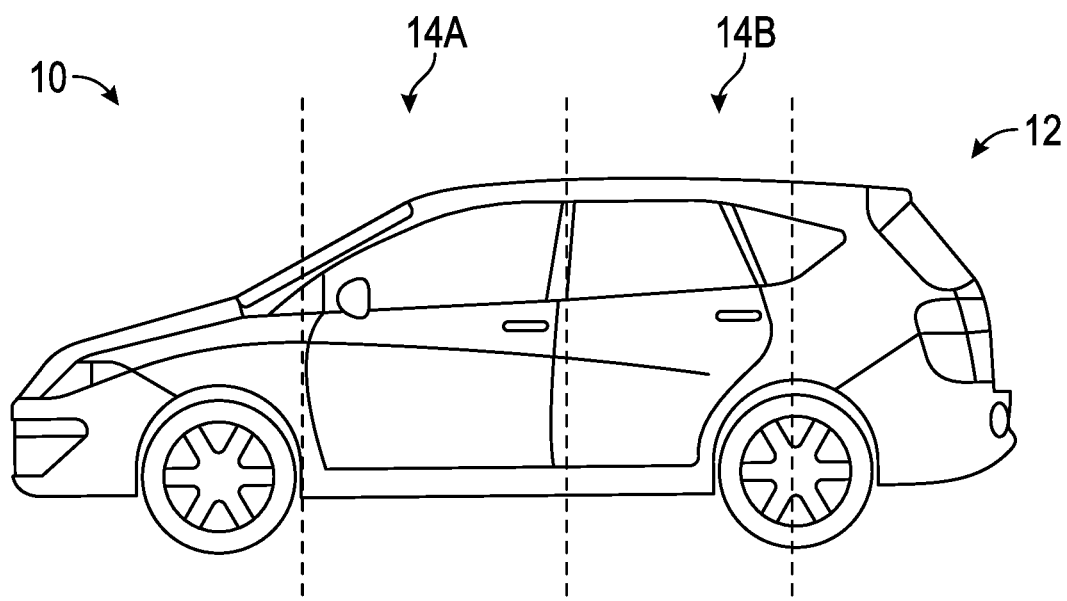
FIG. 1 illustrates an elevation view of a vehicle with which the present invention may be used.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Applicants have created a vacuum cleaner assembly designed for use in a vehicle having a passenger compartment such as those with at least one row of seats and a cargo area. The vacuum cleaner assembly preferably includes a power head, a collection drum or other container, and a hose. The powerhead of the present invention is powered by the vehicle's electrical system and is preferably mounted between exterior body panels and interior compartment panels of the vehicle. For example, the power head may be mounted between the exterior body panels and the interior compartment panels adjacent to, but not in the cargo area.

Figure 2:
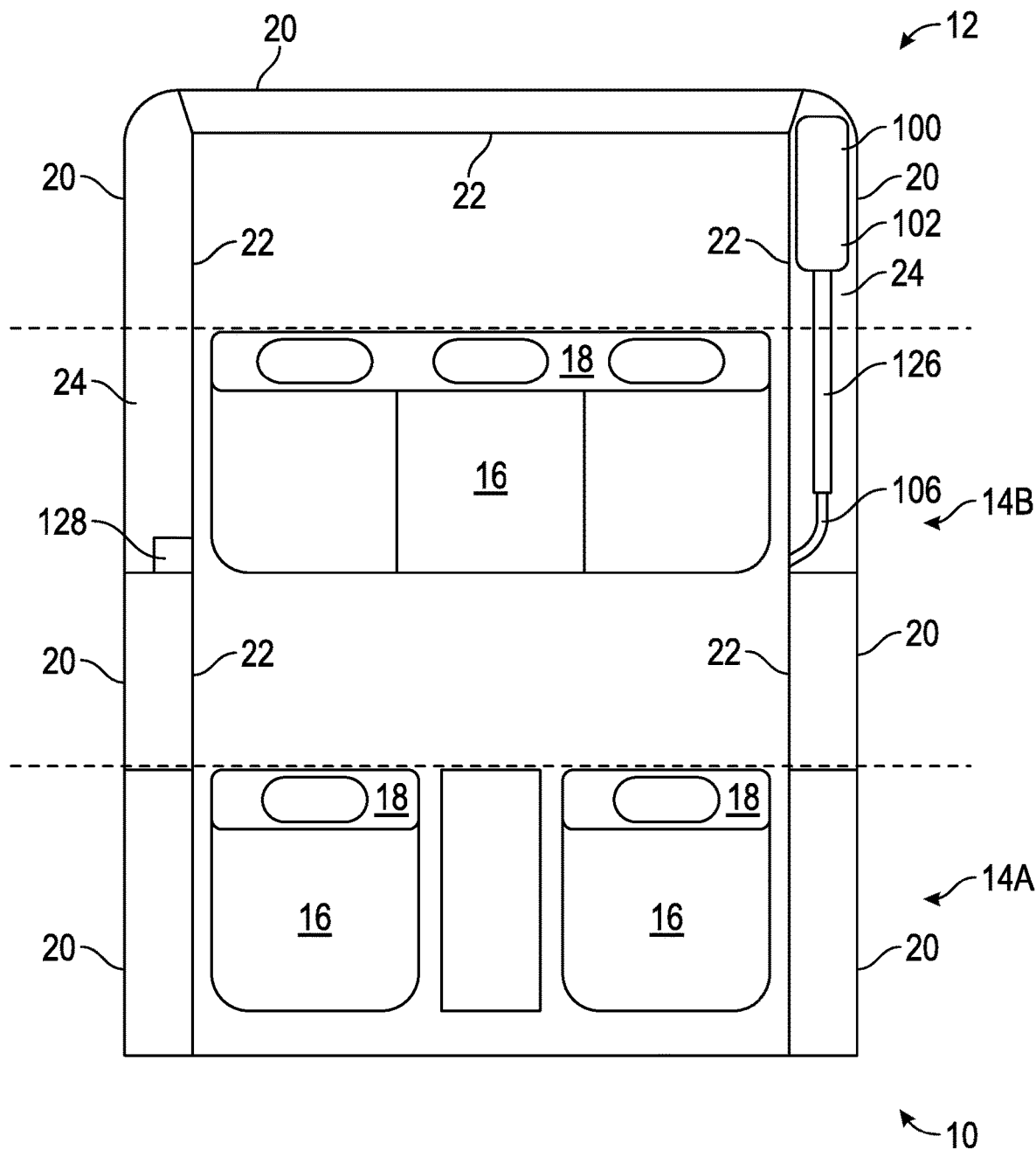
FIG. 2 illustrates partial plan view the vehicle of FIG. 1.

Turning now to the figures, FIG. 1 and FIG. 2 illustrate an exemplary vehicle that might include one or more embodiments of the present invention. The vehicle 10 is preferably a typical Sports Utility Vehicle (SUV) or mini-van, but may be virtually any type of passenger vehicle. In any case, typical vehicles 10 include a cargo area 12 and one or more rows of seats 14a,14b. For example, some SUVs and/or minivans have three rows of seating. These rows of seats 14a,14b may be defined by seats 16 having seat backs 18. More specifically, the rows of seats 14a,14b may be defined by the seat backs 18, such that a first row of seats 14a is that area ahead of that row's seat backs 18 and a second row of seats 14b is that area between the seat backs 18 of the first and second rows 14a,14b. A third row of seats would be the area between the seat backs 18 of the second and third rows, etc. Following this example, the cargo area 12 is that area behind the rearward most seat back 18.

Typical vehicles 10 also include one or more exterior body panels 20, which are typically metal, and one or more interior compartment panels 22, which are often made of plastic. Between these exterior body panels 20 and interior compartment panels 22 are often one or more voids 24, which may be filled or partially filled with insulation sound damping material, wiring, and/or duct work. One of the goals of the present invention is to take advantage of these voids 24. As such the vacuum 100, and/or many of its components are preferably mounted in these voids 24.

More specifically, the vacuum cleaner assembly 100 according to the present invention is preferably designed for use in a vehicle 10 having a passenger compartment such as those with at least one row of seats 14a14b and a cargo area 12. The vacuum cleaner assembly 100 preferably includes a powerhead 102, a collection drum or other container 104, and a hose 106. The powerhead 102 is preferably similar to those used on wet/dry vacuums, such as those that include a motor 108 and a fan 110 driven by the motor 108 to induce airflow through the vacuum 100. For example, the powerhead 102, container 104, hose 106, and/or other components of the assembly 100 may be similar to those disclosed in U.S. Pat. Nos. 5,598,605, 5,606,769, 6,691,396, and/or 8,418,312, which are incorporated herein by specific reference.

A significant difference between common wet/dry vacuums and the vacuum assembly 100 of the present invention is that the powerhead 102 of the present invention is powered by the vehicle's 10 electrical system. Another significant difference is that the power head 102 of the present invention is mounted between the exterior body panels 20 and the interior compartment panels 22 of the vehicle 10. More specifically, the power head 102 is preferably mounted between the exterior body panels 20 and the interior compartment panels 22 adjacent to, but not in the cargo area 12. In some embodiments, the power head 102 and/or drum 104 may be mounted within a center console, between seats.

Figure 3:
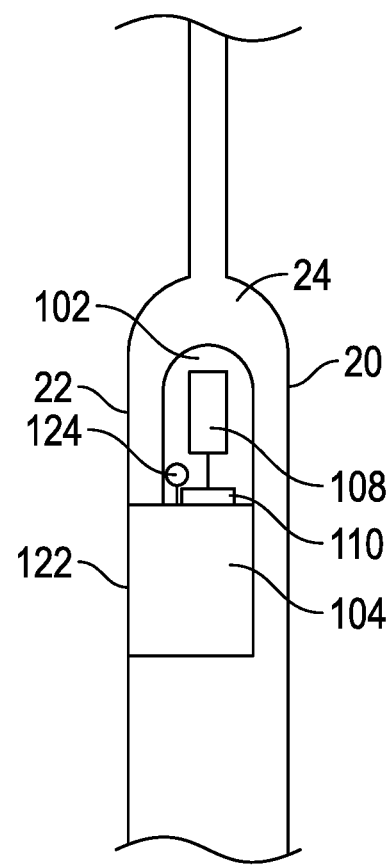
FIG. 3 illustrates partial sectional view the vehicle of FIG. 1.
Figure 4:
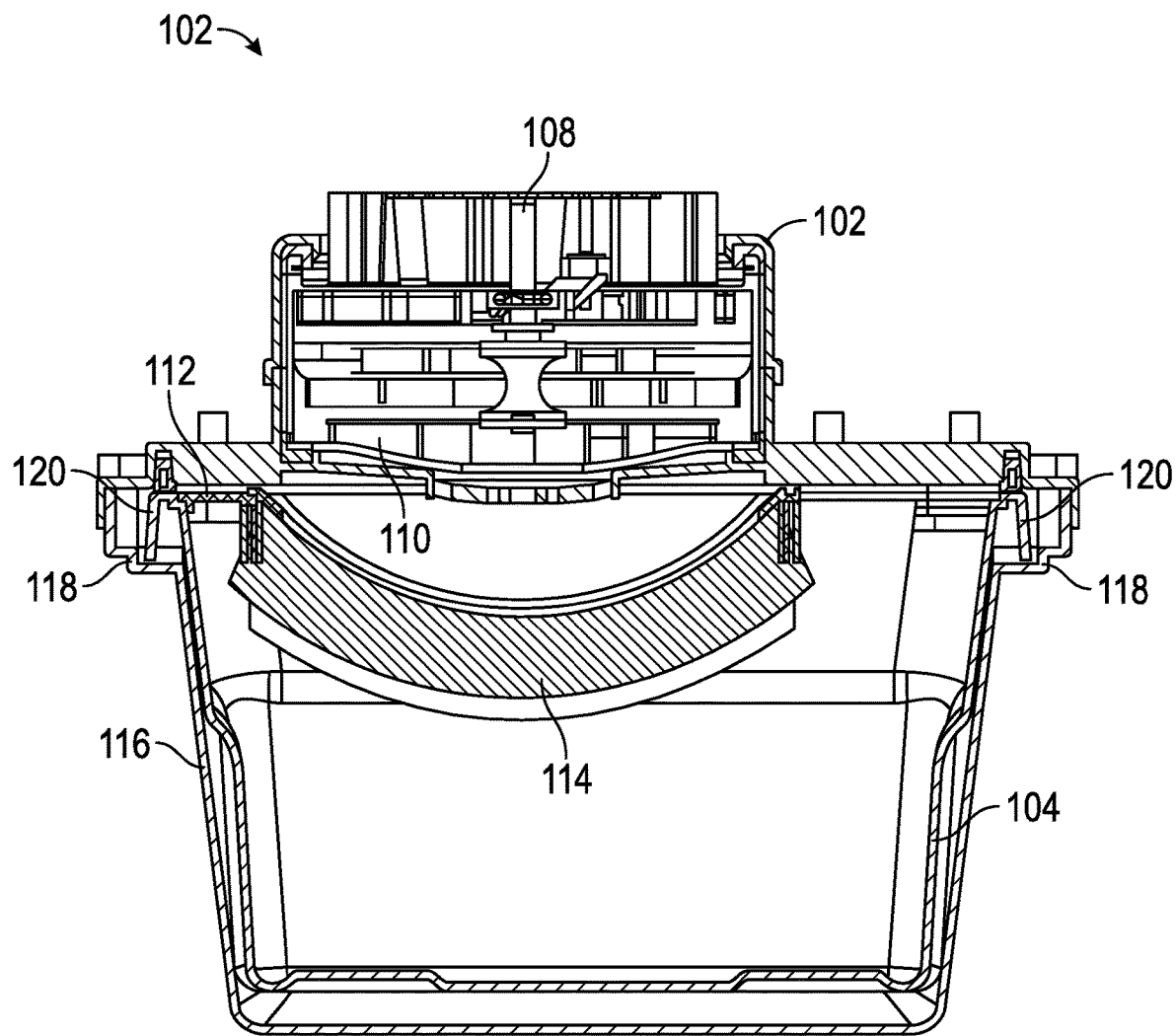
FIG. 4 illustrates sectional view a vacuum cleaner assembly according to certain aspects of the present invention and for use with a vehicle, such as that of FIG. 1.

Similarly, referring also to FIG. 3, the collection drum 104 is preferably removably mounted below the powerhead 102, such that the drum 104 is also mounted between the exterior body panels 20 and the interior compartment panels 22 adjacent to, but not in the cargo area 12. Referring also to FIG. 4, the drum 104 may include a removable lid 112 to help contain the debris entrained in the airflow, collected through the hose 106, and deposited in the drum 104. To prevent the debris from being ingested in the fan 110, a filter 114 may be mounted to the powerhead 102, drum 104 and/or lid 112.

The drum 104 is preferably slidably mounted between the exterior body panels 20 and the interior compartment panels 22, such that it may be slid out and removed in order to dispose of the debris collected therein. For example, the drum 104 may be mounted in a compartment 116 between the exterior body panels 20 and the interior compartment panels 22. The compartment 116 may include one or more rails 118, upon which protrusions 120 of the drum 104 slide. These rails 118 and protrusions 120 may form sliding tracks which may also include rollers and/or bearings. The rails 118 are preferable angled, such that the drum 104 is lifted to seat with and seal to the powerhead 102 as the drum 104 is slid into the compartment 116.

In one embodiment, the rails 118 include multiple differently angled sections, such that the drum 104 slides in easily, initially, but as the drum 104 is being seated into final position, it is lifted more rapidly. Said another way, as the drum 104 is being slid into the compartment 116 it is either not lifted at all or lifted a first amount during a first portion of its travel into the compartment. But, as the drum 104 is being slid further into the compartment 116 it is lifted a second amount, greater than the first amount, during a second, later portion of its travel into the compartment 116.

Of course, in certain embodiments, it is beneficial to allow a front of the drum 104 and a back of the drum 104 to slide and lift independently. For example, the compartment 116 may include a first pair of rails 118, upon which a first pair of protrusions 120 of the drum 104 slide, such as to control the slide and lift of a rear portion of the drum 104. The compartment 116 may also include a second pair of rails 118, upon which a second pair of protrusions 120 of the drum 104 slide, such as to control the slide and lift of a front portion of the drum 104, independently from the rear portion.

The drum 104 is preferably normally hidden from view, unseen from the passenger compartment. Of course, as discussed, the drum 104 should be accessible, so that the debris collected therein may be removed. Therefore, the vacuum 100 preferably includes a drum access panel 122. The drum access panel 122 may be one of the interior compartment panels 22, attached thereto, or separate therefrom. For example, the drum access panel 122 may be hingedly attached to one of the interior compartment panels 22, such that the drum access panel 122 may be rotated to allow access to the drum 104. Alternatively, the drum access panel 122 may be removably attached to one of the interior compartment panels 22, such that the drum access panel 122 may be removed to allow access to the drum 104. Alternatively, drum access panel 122 may be secured to the drum 104 itself, such that sliding the drum 104 out of the compartment 116 also separates the drum access panel 122 from the interior compartment panels 22.

The hose 106 preferably extends forwardly from the powerhead 102 and/or drum 104, or a vacuum inlet 124 of the powerhead 102 and/or drum 104. For example, the hose 106 may be routed between the exterior body panels 20 and the interior compartment panels 22 from adjacent the cargo area forwardly towards the first or second row of seats 14a,14b. More specifically, the hose 106 may be routed between the exterior body panels 20 and the interior compartment panels 22 from adjacent the cargo area forwardly towards the second row of seats 14b. Alternatively, or additionally, the hose 106, or a second hose, may be routed between the exterior body panels 20 and the interior compartment panels 22 from adjacent the cargo area forwardly towards the first row of seats 14a. Furthermore, the hose 106, or another hose, may be routed between the exterior body panels 20 and the interior compartment panels 22 from adjacent the cargo area into the cargo area. Where the power head 102 and/or drum 104 is mounted within a center console, between seats, the hose 106, or another hose, may be routed under or between floor panels.

The hose 106 is preferably flexible and may be expandable to reach distant areas, while being able to collapse within the void 24 between the exterior body panels 20 and the interior compartment panels 22. However, it is also desirable that the hose 106 not become entangled in the void 24, and/or snag on other items within the void 24. Thus, the hose 106 may be mounted in a rigid tube 126 extending from the drum 104 to adjacent the row of seats 14a14b between at least one of the exterior body panels 20 and at least one of the interior compartment panels 22. The hose 106 is preferably extendable from the tube 126 and may slide within the tube 126, so that the hose 106 may be partially, or fully, contained within the tube 126 and selectively extend into the passenger compartment. For example, a first end of the hose 106 may slide along the tube 126, but be captive, such that it cannot be pulled from the tube 126, whereas a second end of the hose 106 may be seated adjacent, or at least partially within, the tube 126 and be selectively extended to reach distant areas of the passenger compartment.

The vacuum cleaner assembly 100 according to the present invention may also include at least one control panel 128 mounted to, or within, one or more of the interior compartment panels 22 such that the control panel 128 is operable from the passenger compartment. For example, a control panel 128 may be mounted to, or within, one or more of the interior compartment panels 22 such that the control panel 128 is operable from the cargo area 12. Alternatively, or additionally, a control panel 128 may be mounted to, or within, one or more of the interior compartment panels 22 such that the control panel 128 is operable from one or more of the rows of seats 14a14b.

Other and further embodiments utilizing one or more aspects of the inventions described above can be devised without departing from the spirit of Applicant's invention. For example, the powerhead 102 and/or drum 104 may be mounted between at least one of the exterior body panels 20 and at least one of the interior compartment panels 22 adjacent other areas of the passenger compartment, such as adjacent one of the rows of seats 14a,14b. Further, the various methods and embodiments of the methods of manufacture and assembly of the system, as well as location specifications, can be included in combination with each other to produce variations of the disclosed methods and embodiments. Discussion of singular elements can include plural elements and vice-versa. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A vacuum cleaner assembly for use in a vehicle having a passenger compartment with at least one row of seats and a cargo area, the vehicle further comprising one or more exterior body panels and one or more interior compartment panels, the assembly comprising:
   a powerhead including—a motor powered by the vehicle's electrical system, and a fan driven by the motor to induce airflow through the vacuum, wherein the powerhead is mounted between at least one of the exterior body panels and at least one of the interior compartment panels;
   a collection drum removably mounted below the powerhead between at least one of the exterior body panels and at least one of the interior compartment panels, wherein the drum is slidably mounted on tracks configured to lift the drum as the drum slides on the tracks such that the drum seals with the powerhead; and an inlet hose extending from the powerhead, the inlet hose routed between at least one of the exterior body panels and at least one of the interior compartment panels.

2. The assembly of claim 1, further including a filter mounted in the drum removably secured to the powerhead.

3. The assembly of claim 1, wherein the drum includes a drum mounted interior compartment panel and is removably mounted between the drum mounted interior compartment panel and at least one of the exterior body panels, adjacent the cargo area.

4. The assembly of claim 1, wherein the drum is slidably mounted between at least one of the exterior body panels and a drum interior compartment panel, adjacent the cargo area.

5. The assembly of claim 4, wherein the drum interior compartment panel is secured to the drum.

6. The assembly of claim 4, wherein the drum interior compartment panel must be removed to gain access to the drum.

7. The assembly of claim 1, wherein the powerhead and drum are further mounted adjacent the cargo area and the inlet hose is routed from adjacent the cargo area to forward of the row of seats between the exterior body panel and the interior compartment panel.

8. The assembly of claim 1, wherein the inlet hose extends adjacent the row of seats.

9. The assembly of claim 1, wherein the inlet hose extends adjacent a rearward most row of seats.

10. The assembly of claim 9, wherein the inlet hose is mounted in a rigid tube extending from the drum adjacent the cargo area to adjacent the row of seats between at least one of the exterior body panels and at least one of the interior compartment panels.

11. The assembly of claim 10, wherein the inlet hose slides within the tube.

12. The assembly of claim 10, wherein the inlet hose is extendable from the tube.

13. The assembly of claim 10, wherein the inlet hose is extendable into the passenger compartment.

14. The assembly of claim 10, wherein a first end of the inlet hose is extendable into the passenger compartment and a second end of the inlet hose slides within the tube.

15. The assembly of claim 1, further including a control panel mounted to at least one of the interior compartment panels such that the control panel is operable from the passenger compartment.

16. The assembly of claim 1, further including a control panel mounted to at least one of the interior compartment panels such that the control panel is operable from the cargo area.

17. The assembly of claim 1, further including a control panel mounted to at least one of the interior compartment panels such that the control panel is operable from the at least one row of seats.

18. The assembly of claim 1, wherein the passenger compartment includes a first row of seats, a second row of seats behind the first row of seats, with the cargo area behind the second row of seats.

19. The assembly of claim 18, wherein the inlet hose is mounted in a rigid tube extending from the drum adjacent the cargo area to between the first and second row of seats between at least one of the exterior body panels and at least one of the interior compartment panels.

20. The assembly of claim 19, wherein the inlet hose slides within the tube and is extendable from the tube into the passenger compartment.

* * * * *